(12) United States Patent
Verma

(10) Patent No.: US 12,106,150 B2
(45) Date of Patent: Oct. 1, 2024

(54) SYSTEM FOR DATA ANALYTICS USING A LOCAL DEVICE AND A CLOUD COMPUTING PLATFORM

(71) Applicant: SIEMENS AKTIENGESELLSCHAFT, Munich (DE)

(72) Inventor: Amit Verma, Taufkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 637 days.

(21) Appl. No.: 17/254,651

(22) PCT Filed: Jun. 12, 2019

(86) PCT No.: PCT/EP2019/065277
§ 371 (c)(1),
(2) Date: Dec. 21, 2020

(87) PCT Pub. No.: WO2019/243121
PCT Pub. Date: Dec. 26, 2019

(65) Prior Publication Data
US 2021/0294659 A1 Sep. 23, 2021

(30) Foreign Application Priority Data
Jun. 21, 2018 (EP) .................. 18178952

(51) Int. Cl.
*G06F 9/50* (2006.01)
*G06F 9/48* (2006.01)
(Continued)

(52) U.S. Cl.
CPC .......... *G06F 9/5033* (2013.01); *G06F 9/4887* (2013.01); *G06F 9/5072* (2013.01); *G06N 5/022* (2013.01); *H04L 12/66* (2013.01)

(58) Field of Classification Search
None
See application file for complete search history.

(56) References Cited

U.S. PATENT DOCUMENTS 9,392,054 B1 7/2016 Biberman
2007/0011242 A1 1/2007 Mcfarland
(Continued)

FOREIGN PATENT DOCUMENTS

| CN | 106022245 A | 10/2016 | |
|---|---|---|---|
| CN | 106610616 A | 5/2017 | |
| EP | 2173130 A1 * | 4/2010 | .......... H04W 64/003 |
| WO | 2006128148 A1 | 11/2006 | |

OTHER PUBLICATIONS

European Search Report for European Application No. 18178952.0-1213 dated Dec. 4, 2018.
(Continued)

*Primary Examiner* — Eric C Wai
(74) *Attorney, Agent, or Firm* — Lempia Summerfield Katz LLC

(57) ABSTRACT

The present invention relates to a system for data analytics in a network between one or more local device(s) (130) and a cloud computing platform (120), in which data collected and/or stored on the local device(s) (130) and/or stored on the cloud computing platform (120) are processed by an analytical algorithm (A) which is subdivided into at least two sub-algorithms (SA1, SA2), wherein one sub-algorithm (SA1) is executed on the local device(s) (130) and the other sub-algorithm (SA2) is executed on the cloud computing platform (120).

14 Claims, 3 Drawing Sheets

(51) Int. Cl.
*G06N 5/022* (2023.01)
*H04L 12/66* (2006.01)

(56) References Cited

U.S. PATENT DOCUMENTS

| | | | |
|---|---|---|---|
| 2011/0246627 A1* | 10/2011 | Kern | G06F 9/5072 |
| | | | 718/1 |
| 2016/0110972 A1 | 4/2016 | Renkis | |
| 2017/0083312 A1 | 3/2017 | Pindado | |
| 2017/0187796 A1* | 6/2017 | Bragstad | H04L 67/1008 |
| 2017/0195247 A1 | 7/2017 | Tao | |
| 2021/0033688 A1* | 2/2021 | Koch | G01R 33/56 |

OTHER PUBLICATIONS

PCT International Preliminary Examination Report and Written Opinion of International Examination Authority mailed May 25, 2020 corresponding to PCT International Application No. PCT/EP2019/065277 filed Jun. 21, 2019.

PCT International Search Report and Written Opinion of International Searching Authority mailed Oct. 1, 2019 corresponding to PCT International Application No. PCT/EP2019/065277 filed Jun. 21, 2019.

Xu Xusong et al: "Distribution look-up and complexity analysis thereof", microelectronic and computer, No. 09, Jun. 1, 1994. pp. 1-3.

* cited by examiner

SYSTEM FOR DATA ANALYTICS USING A LOCAL DEVICE AND A CLOUD COMPUTING PLATFORM

This application is the National Stage of International Application No. PCT/EP2019/065277, filed Jun. 12, 2019, which claims the benefit of European Patent Application No. EP 18178952.0, filed Jun. 21, 2018. The entire contents of these documents are hereby incorporated herein by reference.

BACKGROUND

The present embodiments generally relate to data analytics in a network between one or more local devices and a cloud computing platform.

In systems based on cloud computing technology, a large number of devices is connected to a cloud computing system via the Internet. The devices may be located in a remote facility connected to the cloud computing system. For example, the devices may include, or consist of, equipment, sensors, actuators, robots, and/or machinery in one or more industrial set-ups. The devices may be medical devices and equipment in a healthcare unit. The devices may be home appliances or office appliances in a residential/commercial establishment.

The cloud computing system may enable remote configuring, monitoring, controlling, and maintaining connected devices (e.g., 'assets'). Also, the cloud computing system may facilitate storing large amounts of data periodically gathered from the devices, analyzing the large amounts of data, and providing insights (e.g., Key Performance Indicators, Outliers) and alerts to operators, field engineers, or owners of the devices via a graphical user interface (e.g., of web applications). The insights and alerts may enable controlling and maintaining the devices, leading to efficient and fail-safe operation of the devices. The cloud computing system may also enable modifying parameters associated with the devices and issues control commands via the graphical user interface based on the insights and alerts.

The cloud computing system may include a plurality of servers or processors (e.g., cloud infrastructure) that are geographical distributed, connected with each other via a network. A dedicated platform (hereinafter referred to as "cloud computing platform") is installed on the servers/processors for providing above functionality as a service (hereinafter referred to as "cloud service"). The cloud computing platform may include a plurality of software programs executed on one or more servers or processors of the cloud computing system to enable delivery of the requested service to the devices and its users.

One or more application programming interfaces (APIs) are deployed in the cloud computing system to deliver various cloud services (e.g., to one or more users).

There is an increasing trend of industrial automation systems, assets, machines, sensors, mobile devices, etc. in all fields of the industrial production, energy, transportation and in other areas as banking, retail, hospitality, and medical health care systems being connected via network connections to the Industrial Internet of Things (IIoT) directly or via cloud gateways. Data analytics (e.g., data mining, deep learning, artificial intelligence) is a core aspect in this whole area of connected things and generates a new level of knowledge and usability.

The analytics of collected data may be performed at the edge of the IIoT devices or the IIOT gateways or the cloud computing platform as the central computing infrastructure.

If data analytics is performed at the edge of the local IIOT devices itself, this enables real-time analytical operations. Since the data is performed or processed at the local device, this avoids sending raw-data to the cloud and thus preserves network bandwidth and is resilient to network issues. It is not necessary to provide a permanent, uninterrupted connection to the Internet in order to be able to use a cloud application, which requires high demands on availability (e.g., in case of devices in the automotive or mobile sector).

If data analytics is performed in the cloud computing platform, this allows the IIoT platform provider(s) to better protect and secure the know-how and intellectual property for analytical algorithms, as it is not necessary to disclose these algorithms to the environment outside of the cloud. As the analytical algorithms are executed centrally in the cloud computing platform, the analytical algorithms need not be deployed on the local edge devices, which are typically not owned by the IIoT platform providers. Further, other types of algorithms and software applications that need higher calculating speed and more memory space (e.g., image recognition and analysis in the automotive sphere or in the scientific or medical area (scanning microscopy, diagnostic radiology, magnetic resonance imaging)) may be used at the IIoT platform so that the quality of the data analytics is higher and faster.

This provides that there are advantages and disadvantages of performing data analytics on the edge of a local device or on the cloud computing platform.

Patent application US 2017083312 A1 provides an example of such an implementation where a wearable sensing device may be configured to operate in one or more modes of operation. For example, each mode may be configured to use one or more sensors to collect and process sensor signals and produce sensor signal data that may be processed by the wearable sensing device or transmitted to the smartphone or hub for processing or subsequently transmitted to the cloud platform for processing, depending on the mode of operation.

SUMMARY AND DESCRIPTION

The scope of the present invention is defined solely by the appended claims and is not affected to any degree by the statements within this summary.

The present embodiments may obviate one or more of the drawbacks or limitations in the related art. For example, techniques that assist in improving data analytics using both a corresponding edge of a local device and a cloud computing platform and providing a highest possible use of a whole network are provided.

According to a first aspect, the present embodiments provide a system for data analytics in a network between one or more local devices and a cloud computing platform, in which data collected and/or stored on the local devices and/or stored on the cloud computing platform are processed by an analytical algorithm that is subdivided into at least two sub-algorithms. At least one sub-algorithm of the at least two sub-algorithms is executed on the one or more local devices, and at least one other sub-algorithm of the at least two sub-algorithms is executed on the cloud computing platform.

In some embodiments, at least one of the at least two sub-algorithms takes a result of at least one other of the at least two sub-algorithms as an input. In other words, at least one of the at least two sub-algorithms may depend on a result of at least one other of the at least two sub-algorithms.

In other embodiments, the sub-algorithms function independently from one another (e.g., do not need any result from any of the other sub-algorithms for performing an intended function). In that case, all of the sub-algorithms may be performed simultaneously (e.g., in parallel).

The analytical algorithm (e.g., overall analytical algorithm) includes or consists of at least two sub-algorithms. The analytical algorithm may be divided into the two or more sub-algorithms. For example, a user or administrator may divide the analytical algorithm into two or more sub-algorithms. Thus, thereby, the sub-algorithms serve the same purpose or, in other words, generate the same result as the analytical algorithm (e.g., produce the same result). By dividing the analytical algorithm into two or more sub-algorithms the analytical algorithm is modularized. The sub-algorithms may be realized by one or more software modules (e.g., computer-implemented) that realize a self-contained task. The overall task of the analytical algorithm may be achieved by the combination of the two or more sub-algorithms.

Embodiments may be used, by way of example, for the analytics and evaluation of, for example, vibration and other data in industrial plants, image data in the scientific and medical area, data for drug development and clinical trials using medical devices in the pharmaceutical sphere, data for route computations in the navigation field, data for image recognition in the automobile area and computer games, etc.

By breaking down the analytical algorithms into sub-algorithms, a hybrid and distributed analytical approach that may be executed on the edge of a local device for real-time characteristics and edge advantages, and on the cloud computing platform for cloud advantages is provided.

With such a hybrid approach for breaking down analytical algorithms into sub-algorithms, a serial and/or parallel execution sequence for the sub-algorithms may be defined. For example, at least a first sub-algorithm of the plurality of sub-algorithms may be assigned to be executed on the edge (e.g., the local device or a gateway), whereas at least a second sub-algorithm of the plurality of sub-algorithms may be assigned to be executed on the cloud computing platform. Subsequently, the plurality of sub-algorithms may be distributed to corresponding places of execution in accordance with assignment (e.g., deployed). The division of the analytical algorithm may be based on the specific application the analytical algorithm will be used. For example, the resources available on the local device and/or the gateway may be taken into account when dividing the analytical algorithm into a plurality of sub-algorithms. Additionally or alternatively, an affinity indicator may be determined or assigned to the analytical algorithm and/or to one or more sub-algorithms of the plurality of sub-algorithms, as will be described in the following.

Further, the analytical algorithm may include at least one affinity indicator or preference indicator, where the affinity indicator indicates for at least one sub-algorithm of the analytical algorithm, or for the analytical algorithm itself, where the sub-algorithm may be ideally executed (e.g., on the cloud computing platform, the gateway, and/or the one or more local devices). This information is also designated as affinity/preference of the analytical algorithm, or of any of the sub-algorithms, respectively.

In some embodiments, the affinity indicator for the analytical algorithm and/or for at least one of the sub-algorithms may indicate that a particular sub-algorithm may be executed on a specific device or location. In some embodiments, the affinity indicator for the analytical algorithm and/or for at least one of the sub-algorithms may indicate that a particular sub-algorithm is to be executed on a specific device or location.

In one embodiment, the analytical algorithm includes data indicating into which sub-algorithms the analytical algorithm may be sub-divided or split up. In one embodiment, for each such sub-algorithm indicated, an affinity indicator is provided.

In some embodiments, the sub-algorithms are able to dynamically move, or be moved, between the cloud, the gateway(s), and/or the one or more local devices based on considerations such as affinity/preference (e.g., on an affinity indicator), available resources and computer performance, etc. Whether or not a specific sub-algorithm is movable or not may be indicated by a corresponding movability indicator of the sub-algorithm or of the analytical algorithm itself.

Additionally, a workflow engine may be created for defining the sub-algorithms, assigning execution sequence, and assigning affinity/preference to certain types of IIoT devices.

In further embodiments, the sub-algorithm designated for execution on the local device may be shifted to the gateway. According to other embodiments, the sub-algorithms are executed in a serial and/or parallel sequence.

The system may also include a software application that controls a workflow regarding the sequence and the location of the execution of the sub-algorithms.

This software application may be stored advantageously in an analytics runtime module (ARM) of the local device(s) and/or the gateway(s) and/or the cloud computing platform.

According to other embodiments, an affinity/preference is defined regarding the location of execution and the run-time for each sub-algorithm (e.g., in an affinity indicator).

The definition of the affinity/preference or, in other words, the affinity indicator may be based on computer performance and resources and/or availability of the cloud computing platform and/or data structure of the processed data.

According to other embodiments, the analytical algorithm is configured as a clustering and/or a neural network and/or a Support Vector Machine and/or a blockchain that is subdivided into sub-algorithms.

In some embodiments, the processed data is collected from vibration sensors and/or acoustical sensors and/or optical sensors and/or temperature sensors and/or pressure sensors and/or chemical and/or piezoelectric sensors.

In other embodiments, a plurality of local devices is connected in the network. The affinity indicator may be configured to indicate not only that a sub-algorithm is to be executed on and by an unspecified local device but may also indicate by which particular local device of the plurality of local devices the sub-algorithm is to be executed.

The one or more local device may be configured as an industrial pump, a medical device, an image device, mobile device, an automotive device and/or an analytical scientific instrument.

According to a second aspect, the present embodiments provide a method for data analytics in a network between one or more local devices and a cloud computing platform, in which data collected and/or stored on the one or more local devices and/or stored on the cloud computing platform are processed by an analytical algorithm A that is subdivided into at least two sub-algorithms SA1, SA2. At least one sub-algorithm is executed on the one or more local devices, and at least one other sub-algorithm SA2 is executed on the cloud computing platform.

Additionally, the present embodiments provide, according to a third aspect, a local device configured for a system according to the first aspect. For example, the local device may be configured as an industrial pump, a medical device, an image device, a mobile device, an automotive device, and/or an analytical scientific instrument.

According to a fourth aspect, the present embodiments provide a cloud computing platform configured for use in a system according to the first aspect.

According to a fifth aspect, the present embodiments provide a computer program product including executable program code configured to, when executed, perform the method according to the second aspect.

According to a sixth aspect, the present embodiments provide a non-transient computer-readable data storage medium including executable program code configured to, when executed, perform the method according to the second aspect. The non-transient computer-readable data storage medium may include or consist of any type of computer memory (e.g., a semiconductor memory).

According to a seventh aspect, the present embodiments provides a data stream representing, or configured to provide, program code configured to, when executed, perform the method according to the second aspect.

DETAILED DESCRIPTION

In the following description, for purposes of explanation and not limitation, specific details are set forth in order to provide a thorough understanding of the present embodiments. The present embodiments may be practiced in other implementations that depart from these specific details.

Figure 1:
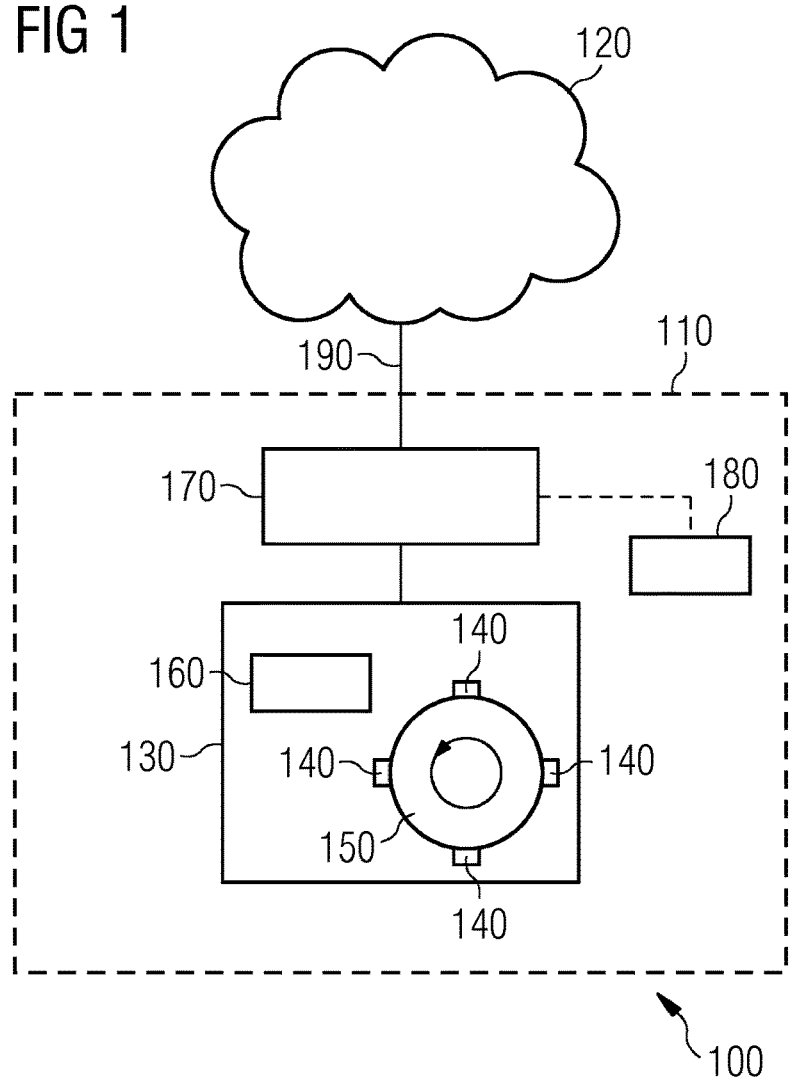
FIG. 1 provides a general overview of a system according to an embodiment of a first aspect.

FIG. 1 provides a general overview of one embodiment of a system 100 for data analytics in a network of an industrial plant 110 and a cloud computing platform 120. The industrial plant 110 in this embodiment includes, as a local device 130, an industrial pump. However, additional local devices 130 may be added to the system 100. Acceleration sensors 140 (e.g., accelerometers) are placed on the pump 130 as an example of a mechanical component to capture rotational and vibration data, which helps in early detection of various failure modes encountered in rotation mechanical equipment.

In a simplified view, the industrial pump 130 has a mechanical system 150 and a controller 160. In the illustrated example, four accelerometers 140 are mounted on the mechanical rotating part 150 of the pump 130 to capture acceleration/vibration measurement data. The sensors 140 are connected to the pump controller 160. The pump controller 160 includes an IIOT agent 161 and is connected to an IIoT gateway 170 that is connected by a network 190 to the IIOT cloud 120.

The IIoT gateway 170 may include a plurality of IIoT gateway modules 171. The collected and generated data may be stored and processed at the pump controller 160 and/or the IIoT gateway 170 and/or further data storage(s) and/or the IIoT cloud computing platform 120. The stored data may include reconstructed data, compressed data, segmented data, and other data related to the local device 130. The network 190 may include one or more wide area networks (WAN), such as Internet, local area networks (LAN), or other networks that may facilitate data communication.

The network 190 may be divided into sub-networks that allow access to all the other components connected to the network 190. The network 190 may include an encryption scheme that may be employed over the public Internet. The network 190 may be configured in a wired and/or wireless configuration that supports data transfer.

The displayed representation is intended to illustrate one possible configuration of the system 100. Other configurations may include fewer components, and in other configurations, additional assets 180 may be utilized. These changes in configurations and components may increase or alter the capabilities of the system 100. Especially in the field of medical imaging devices for capturing high-resolution medical images of a patient such as magnetic resonance imaging (MRI) machines, computer tomography, x-ray, positron emission tomography, scanning microscopy, and ultrasound imaging systems, the sensors are configured to capture image data (e.g., sensors such as charged-coupled devices (CCD)). Also, other types of sensors such as acoustical, optical, piezoelectric, pressure, temperature, and chemical sensors may be used to collect additional data for a specific local device 130.

Figure 2:
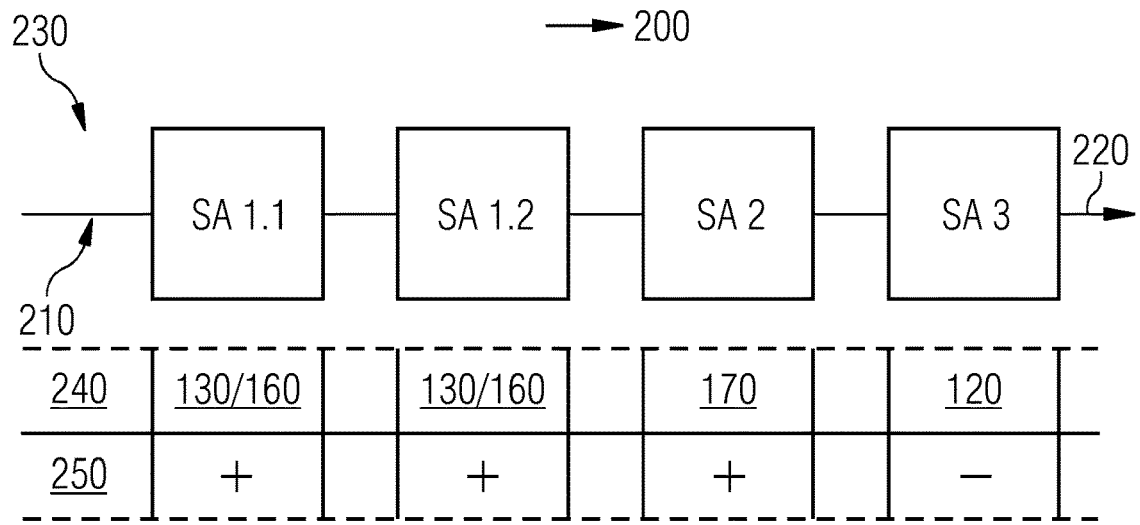
FIG. 2 shows a workflow for performing data analytics according to embodiments.

FIG. 2 is a diagram representing one embodiment of a workflow 200 of data processing and analysis that is executed both on the local device 130 and the cloud computing platform 120 of the system 100. The workflow 200 may also be performed as part of a method according to an embodiment of the second aspect of the present embodiments.

For the vibration case as illustrated in FIG. 1, as an example, the analytical algorithm(s) A are broken down into the following sub-algorithms:

A first sub-algorithm 1 (SA1.1 and SA1.2) is generated for up-sampling or down-sampling the time-series vibration data and normalization of the data in a standardized format.

A second sub-algorithm 2 (SA2) is generated for the calculation of a frequency domain transformation or frequency spectrum. An example for such an algorithm is a Fast Fourier Transformation (FFT).

A third sub-algorithm 3 (SA3) is generated for the analytics of frequency components in the vibration spectrum to determine failure modes in the mechanical equipment.

These three sub-algorithms SA1.1+SA1.2, SA2, SA3 may be executed on separate computing units. However, more than three sub-algorithms SAn may be provided for other analytical algorithms A or other data structures. Several analytical algorithms A such as clustering, neural networks, Support Vector Machines, and/or blockchain may be used in the framework of the present embodiments. Further, it is possible to create, for the workflow 200 of processing the sub-algorithms SA1, SA2, SA3, . . . San, a network or a tree-like structure with several affinity levels that may be executed in a dynamic way.

In this illustrated example, SA1 is to be performed in real-time, but the sub-algorithm SA1 is computationally not very complicated, nor does the sub-algorithm SA1 require a lot of computer performance/resources. Further, the sub-algorithm SA1 does not contain specific knowledge or intellectual property from the perspective of a provider of an analytical algorithm A. Thus, an affinity indicator of the sub-algorithm SA1 may indicate that sub-algorithm SA1 may (and should) be executed on the local device 130 or the pump-controller 160.

However, further in the illustrated example, SA2 uses much more computer performance, but does not include any specific know-how or intellectual property. Therefore, an affinity indicator of the sub-algorithm SA2 may indicate that sub-algorithm SA2 may (and should) be executed on the IIOT gateway 170 that has more computing resources compared to the local device 130.

Further in the illustrated example, SA3 involves the analytics of frequency components, which requires specific domain knowledge that is the know-how and/or intellectual property of the analytical provider(s). SA3 may also involve benchmarking or comparison of the frequency components of other similar industrial assets. Therefore, the affinity indicator may indicate that the sub-algorithm SA3 may (and should) be executed in the IIoT cloud computing platform 120.

The workflow 200 starts with incoming raw data 210 and ends with a result 220 of the analytic algorithm(s) A. The first row 230 lists the various sub-algorithms (SA1, SA2, . . . SAn) of the overall analytical algorithm(s) A and the execution sequence of the sub-algorithms. For example, in the illustrated example, SA2 may not be executed before SA1.2 has finished execution, as SA2 requires, as an input, an output of SA1.2.

In other realizations of the system 100, the sub-algorithms SA1, SA2, . . . SAn may also be executed in a parallel sequence, and the sequence may be changed in a dynamic way according to the application case. Further, in the illustrated example, only one local device 130 is used. However, there may be a network of several local devices 130 connected with the cloud computing platform 120, and/or the local devices 130 may have connections between themselves.

The second row 240 in FIG. 2 defines the affinity/preference (e.g., the contents of the respective affinity indicator) for the execution of a particular SA on a specific device 130 and/or a gateway 170 and/or the cloud 120. Affinity towards the local device 130 provides that the specific SA has a preference to be executed on the industrial pump itself (e.g., the controller 160 of the pump 130). Similarly, a SA may have a preference to be executed on the IIoT gateway 170 or the IIoT cloud computing platform 120.

Further, it is possible that the execution of the SA may be changed in a dynamic way due to capacities or availability of the IIoT cloud computing platform 120 or other criteria such as runtime or data structure of the processed data.

The third row 250 in FIG. 2 represents the feature "moveable" defining if a particular SA may move, or be moved, to another possible computing unit (e.g., the content of an optional movability indicator). If the respective SA is moveable, this is indicated by a "+" sign in FIG. 2; if the respective SA is not moveable, this is indicated by a "−" sign in FIG. 2. For example, if the local device 130 is overburdened or does not have enough computing resources, the sub-algorithm SA1.2 may move, or may be moved, to the IIoT gateway 170. Similarly, if the IIOT gateway 170 is overburdened, the SA2 may move, or be moved, to the cloud computing platform 120 for execution.

Figure 3:
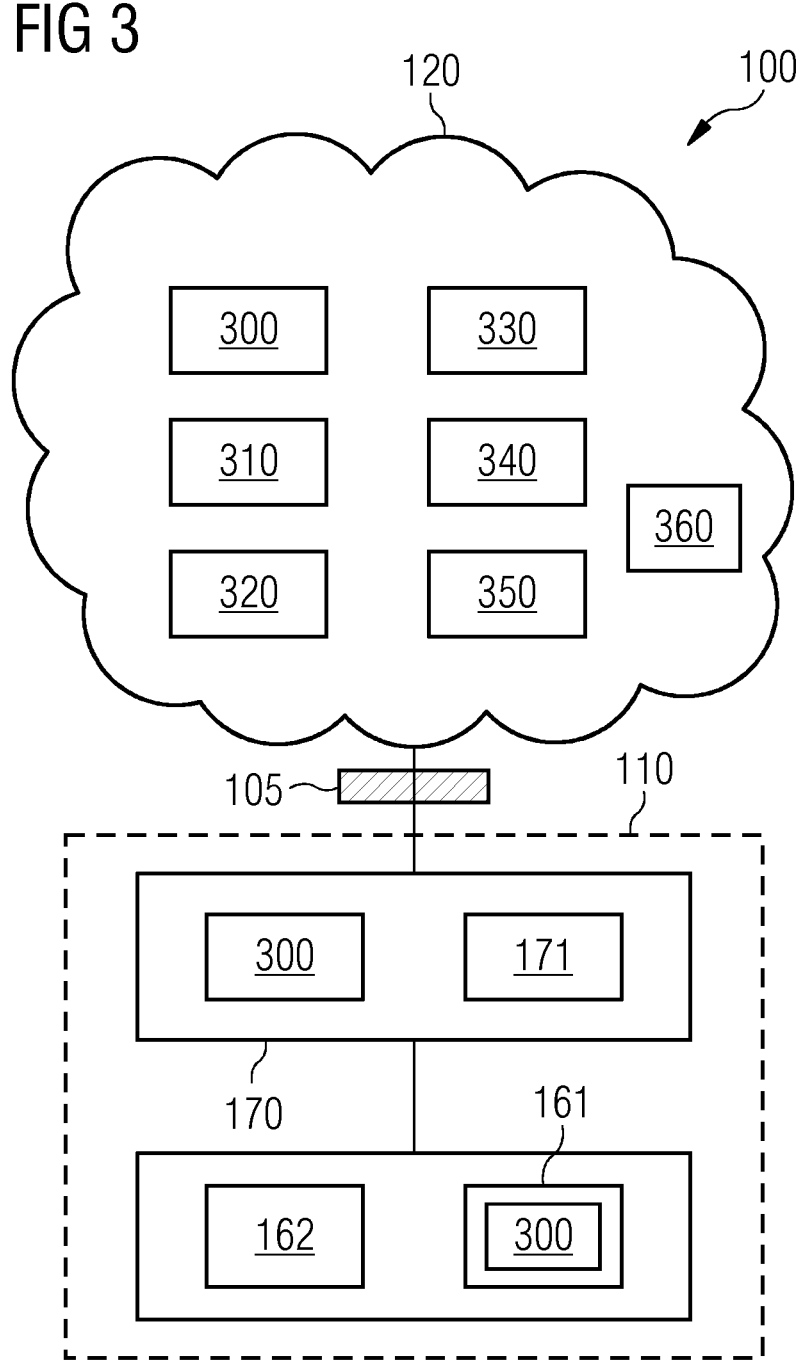
FIG. 3 schematically illustrates a number of data analytics modules in a cloud computing platform and an exemplary industrial plant.

FIG. 3 shows a schematic diagram of one embodiment of the entire system 100 with modules configured to implement the distributed analytics approach.

Each part of the IIoT system 100 (e.g., the cloud 120, the IIoT gateway(s) 170 and the local device(s) 130) includes an analytics runtime module (ARM) 300. In other words, a runtime environment in which the one or more of the different sub-algorithms run is provided. This ARM 300 executes the different sub-algorithms SA1, SA2, SA3. In the local device 130, the ARM 300 may also be part of the IIoT agent 161. However, further configurations are possible. The industrial plant 110 and the cloud computing platform 120 may be separated by a firewall 105. As the case may be, the two or more sub-algorithms may be executed in the runtime environment in the local device, the gateway, or the cloud computing platform. This may be the case because the runtime environments are architecturally the same or similar and thus allow for the sub-algorithms to be deployed at the respective location. Now, if the availability of resources, for example, at the local device and/or the gateway change are reduced due to other tasks performed by the local device, one or more of sub-algorithms deployed at the local device and/or the gateway may be re-assigned to be executed in the cloud (e.g., moved to the cloud). The same is true for the other way around (e.g., when resources at the local device and/or the gateway are freed, one or more sub-algorithms may be moved from the cloud to the local device or the gateway).

The cloud computing platform 120 additionally contains an analytics workflow module (AWM) 310 and an analytics scheduler 320. The AWM 310 manages the SAs and provides user interfaces for defining the SAs as illustrated in FIG. 2. The scheduler 320, in another embodiment, may also be a part of the IIoT gateway 170 to provide local scheduling capabilities. Further, the cloud computing platforms 120 includes a data base 330, an analytics configuration database 340, a communication module 350, and other IIOT modules 360.

In the following, the acts are described how the system may be used: An administrator or a data scientist may use a user interface provided by the AWM 310 to provide (e.g., define) an analytics algorithm A together with the different SAs, a corresponding execution sequence, a corresponding affinity to IIOT devices, etc. Criteria such as computer performance, relevance to know-how and intellectual property, etc. may be used to define the SAs and corresponding affinities (e.g., affinity indicators) to the cloud 120 or the local devices 130 and/or corresponding movability indicators.

The AWM 310 saves this configuration in the analytics configuration database 340. However, it is possible that a further software application is implemented in the AWM 310 that may dynamically adjust the execution sequence of the sub-algorithms according to criteria such as availability of the cloud computing platform 120. This may be of interest in the case of mobile local devices 130 that have limited access to the cloud 120.

After the generation of the analytical algorithm A and the Sas, the administrator triggers the deployment of the algorithm A along with the SAs. This may also be triggered automatically based on some other analytics results or criteria.

The analytics scheduler 320 reads the analytics configuration from the analytics configuration database 340. The analytics scheduler 320 determines other criteria, such as resource availability on the IIOT gateway 170 and local device 130, by querying these entities. Based on the configuration rules and the resource availability, the analytics scheduler 320 generates the scheduling plan for the SAs.

According to the scheduling plan, the analytics scheduler 320 provides the SA definitions to the analytics runtime module ARM 300 on the cloud computing platform 120, the IIoT gateway 170, or the local device(s) 130 for the execution of the SAs. By defining several sub-algorithms SA1, SA2, . . . San, a distributed analytics framework may be created. By splitting an analytical algorithm A into sub-algorithms SA1, SA2, . . . San, an analytical data execution in the cloud computing platform 120 and/or on local device(s) 130 may be performed based on business and/or performance requirements.

With this approach, an analytics provider may better preserve her/his domain know-how or intellectual property as the domain specific part of the analytic algorithm A is executed in the cloud computing platform 120 under her/his control. This also allows an enhanced data security of the analytical models in the IIoT approach.

Additionally, since the sub-algorithms SA1, SA2, . . . SAn may be dynamically shifted between different local IIOT devices based on resources availability, this enhances the performance and minimizes bottlenecks in an IIoT system.

The distributed analytics approach may be used in open IIOT operating systems like MindSphere®.

The above embodiment regarding vibration data shows how an analytical algorithm A may be broken down into sub-algorithms SA1, SA2, . . . SAn and may then be executed on different devices in an IIOT context. Similarly, other analytical algorithms (e.g., clustering, neural networks, Support Vector Machines, blockchain, etc.) may be used and broken down into sub-algorithms SA1, SA2, . . . SAn.

Figure 4:
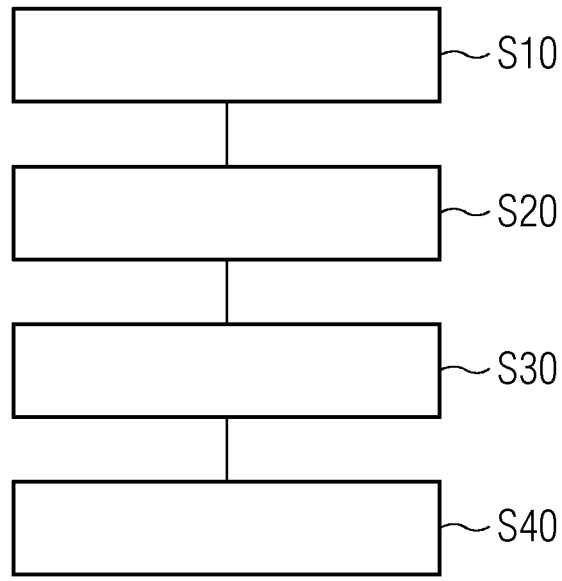
FIG. 4 shows a schematic flow diagram illustrating an embodiment of a method according to a second aspect.

FIG. 4 shows a schematic flow diagram illustrating a method according to an embodiment of the second aspect. The method of FIG. 4 will be described partially using reference signs of FIG. 1 to FIG. 3, although the method of FIG. 4 is not restricted to the embodiments described in FIG. 1 to FIG. 3. The method of FIG. 4 may be executed using any of the embodiments described with respect to FIG. 1 to FIG. 3 and may, accordingly, be adapted and modified according to any variations and modifications described in the foregoing.

In act S10, an analytical algorithm A is provided (e.g., defined, received, or stored) in a network between one or more local device(s) 130 and a cloud computing platform 120. The analytical algorithm is configured to process data collected and/or stored on the local device(s) 130 and/or stored on the cloud computing platform 120.

In act S20, the analytical algorithm A is sub-divided or split up into at least two sub-algorithms SA1, SA2. Act S20 may be performed simultaneously with act S10. For example, when the analytical algorithm is being defined, the analytical algorithm may be defined together with the sub-algorithms.

In act S30, at least one of the at least two sub-algorithms SA1, SA2 is executed on or by the local device(s) 130. A local device 130 according to the third aspect of the present embodiments may be provided to perform the act S30, for example.

In act S40, at least one other of the at least two sub-algorithms SA2 is executed on or by the cloud computing platform 120. In one embodiment, all of the sub-algorithms SA2 that are not executed on the local device 130 are executed on the cloud computing platform 120. A cloud computing platform 120 according to the fourth aspect of the present embodiments may be provided to perform the act S40, for example.

Figure 5:
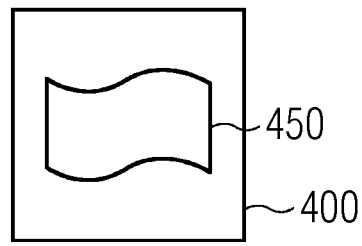
FIG. 5 schematically illustrates a computer program product according to an embodiment of a fifth aspect.

FIG. 5 schematically illustrates one embodiment of a computer program product 400 including executable program code 450 configured to, when executed, perform the method according to the second aspect (e.g., as has been described with respect to FIG. 3 and/or FIG. 4).

Figure 6:
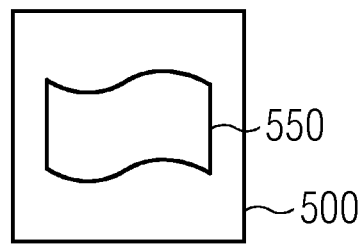
FIG. 6 schematically illustrates a non-transient computer-readable data storage medium according to an embodiment of a sixth aspect.

FIG. 6 schematically illustrates one embodiment of a non-transient computer-readable data storage medium 500 including executable program code 550 configured to, when executed, perform the method according to the second aspect (e.g., as has been described with respect to FIG. 3 and/or FIG. 4).

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A system for data analytics in a network between one or more local devices and a cloud computing platform, the system comprising:
 a processor configured to process data collected, stored, or collected and stored on the one or more local devices, stored on the cloud computing platform, or a combination thereof by an analytical algorithm that is sub-divided into at least two sub-algorithms,
 wherein at least one sub-algorithm of the at least two sub-algorithms is executed on the one or more local devices, and at least one other sub-algorithm of the at least two sub-algorithms is executed on the cloud computing platform based on an affinity/preference indicator,
 wherein the affinity/preference indicator is defined regarding a location of execution and run-time for each sub-algorithm of the at least two sub-algorithms, and based on a data structure of the processed data,
 wherein the location of execution regards distribution of the at least two sub-algorithms to a place of execution in accordance with deployment, and
 wherein the at least one sub-algorithm designated for execution on the one or more local devices is dynamically shiftable to a gateway based on computing resources of the one or more local devices.

2. The system of claim 1, wherein the one or more local devices and the cloud computing platform are connected by the gateway.

3. The system of claim 1, wherein the at least two sub-algorithms are executed in a serial, parallel, or serial and parallel sequence.

4. The system of claim 3, wherein a workflow regarding the sequence and the location of the execution of the at least two sub-algorithms is controlled by a software application.

5. The system of claim 4, wherein the software application is stored in an analytics runtime module of the one or more local devices, the gateway, the cloud computing platform, or any combination thereof.

6. The system of claim 1, wherein the definition of the affinity/preference indicator is regarding the run-time of the at least two sub-algorithms and based on computer performance and resources, availability of the cloud computing platform, domain knowledge associated with the cloud computing platform, the at least two sub-algorithms, or the cloud computing platform and the at least two sub-algorithms.

7. The system of claim 1, wherein the analytical algorithm is configured as a clustering, a neural network, Support Vector Machines, a blockchain, or any combination thereof subdivided into sub-algorithms.

8. The system of claim 1, wherein the processed data are collected from vibration sensors, acoustical sensors, optical sensors, temperature sensors, pressure sensors, chemical, piezoelectric, or chemical and piezoelectric sensors, or any combination thereof.

9. The system of claim 1, wherein the one or more local devices comprise a plurality of local devices that are connected in the network.

10. The system of claim 1, wherein the one or more local devices include an industrial pump, a medical device, an image device, a mobile device, an automotive device, an analytical scientific instrument, or any combination thereof.

11. The system of claim 1, wherein a movability indicator is defined regarding movability of the at least two sub-algorithms, the analytical algorithm, or the at least two sub-algorithms and the analytical algorithm.

12. A method for data analytics in a network between one or more local devices and a cloud computing platform, the method comprising:
processing, by an analytical algorithm, data collected, stored, or collected and stored on the one or more local devices, stored on the cloud computing platform, or a combination thereof, the analytical algorithm being subdivided into at least two sub-algorithms,
wherein at least one sub-algorithm of the at least two sub-algorithms is executed on the one or more local devices, and at least one other sub-algorithm of the at least two sub-algorithms is executed on the cloud computing platform based on an affinity/preference indicator,
wherein the affinity/preference indicator is defined regarding a location of execution and run-time for each sub-algorithm of the at least two sub-algorithms, and based on a data structure of the processed data,
wherein the location of execution regards distribution of the at least two sub-algorithms to a place of execution in accordance with deployment, and
wherein the at least one sub-algorithm designated for execution on the one or more local devices is dynamically shiftable to a gateway based on computing resources of the one or more local devices.

13. A local device configured for a system for data analytics in a network between one or more local devices and a cloud computing platform, the local device comprising:
a processor configured to process data collected, stored, or collected and stored on the local device by an analytical algorithm that is subdivided into at least two sub-algorithms,
wherein at least one sub-algorithm of the at least two sub-algorithms is executed on the local device, and at least one other sub-algorithm of the at least two sub-algorithms is executed on the cloud computing platform based on an affinity/preference indicator,
wherein the affinity/preference indicator is defined regarding a location of execution and run-time for each sub-algorithm of the at least two sub-algorithms, and based on a data structure of the processed data,
wherein the location of execution regards distribution of the at least two sub-algorithms to a place of execution in accordance with deployment,
wherein the at least one sub-algorithm designated for execution on the one or more local devices is dynamically shiftable to a gateway based on computing resources of the one or more local devices, and
wherein the local device is configured as an industrial pump, a medical device, an image device, a mobile device, an automotive device, an analytical scientific instrument, or any combination thereof.

14. A cloud computing platform configured for use in a system for data analytics in a network between one or more local devices and the cloud computing platform, the cloud computing platform comprising:
a processor configured to process data stored on the cloud computing platform by an analytical algorithm that is subdivided into at least two sub-algorithms,
wherein at least one sub-algorithm of the at least two sub-algorithms is executed on the one or more local devices, and at least one other sub-algorithm of the at least two sub-algorithms is executed on the cloud computing platform based on an affinity/preference indicator,
wherein the affinity/preference indicator is defined regarding a location of execution and run-time for each sub-algorithm of the at least two sub-algorithms, and based on a data structure of the processed data,
wherein the location of execution regards distribution of the at least two sub-algorithms to a place of execution in accordance with deployment, and
wherein the at least one sub-algorithm designated for execution on the one or more local devices is dynamically shiftable to a gateway based on computing resources of the one or more local devices.

* * * * *